United States Patent
Bly, Jr.

(10) Patent No.: US 8,789,096 B2
(45) Date of Patent: Jul. 22, 2014

(54) APPARATUS, SYSTEMS AND METHODS FOR TRANSMITTING MEDIA CONTENT EVENTS

(75) Inventor: Allan Richard Bly, Jr., Marietta, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 332 days.

(21) Appl. No.: 13/095,759

(22) Filed: Apr. 27, 2011

(65) Prior Publication Data

US 2012/0278835 A1    Nov. 1, 2012

(51) Int. Cl.
*H04N 5/445* (2011.01)
*H04N 7/173* (2011.01)

(52) U.S. Cl.
USPC ............... 725/38; 725/87; 725/101

(58) Field of Classification Search
CPC ...... H04N 21/433; H04N 21/472; H04N 7/08
USPC ............. 725/86–91, 93, 97, 38, 101; 709/203
See application file for complete search history.

(56) References Cited

U.S. PATENT DOCUMENTS

| | | | |
|---|---|---|---|
| 5,206,722 A * | 4/1993 | Kwan | 725/100 |
| 7,624,415 B1 * | 11/2009 | Zhang et al. | 725/95 |
| 7,657,644 B1 | 2/2010 | Zheng | |
| 7,925,781 B1 | 4/2011 | Chan et al. | |
| 2004/0128343 A1 * | 7/2004 | Mayer | 709/203 |
| 2007/0008967 A1 * | 1/2007 | Bressler et al. | 370/390 |
| 2009/0144784 A1 * | 6/2009 | Li et al. | 725/97 |
| 2010/0064324 A1 | 3/2010 | Jenkin et al. | |
| 2010/0064335 A1 | 3/2010 | Jenkin et al. | |

OTHER PUBLICATIONS

Andrew Fecheyr-Lippens, "A Review of HTTP Live Streaming," Internet Citation, Jan. 25, 2010, pp. 1-37, XP002638990, URL: http://issuu.com/andruby/docs/http_live_streaming.

* cited by examiner

*Primary Examiner* — Benjamin R Bruckart
*Assistant Examiner* — Jason Thomas
(74) *Attorney, Agent, or Firm* — Lowe Graham Jones PLLC

(57) ABSTRACT

Systems and methods are operable to transmit at least a portion of a media content event. An exemplary embodiment receives a request from a first media device, wherein the request identifies a media content event of interest; identifies a first media content stream with a concluding portion of the media content event of interest currently transmitting to a second media device; concurrently transmits the concluding portion of the media content event of interest to the first media device; and transmits a second media stream containing an initial portion of the media content event to the first media device.

27 Claims, 5 Drawing Sheets

APPARATUS, SYSTEMS AND METHODS FOR TRANSMITTING MEDIA CONTENT EVENTS

BACKGROUND

Media devices, such as a set top box, are configured to receive media content events from a broadcasting system. Non-limiting examples of media content events include movies, news programs, sporting events, serial comedies and/or dramas, and other program events that are communicated to the media device by a program service provider over the broadcasting system. Non-limiting examples of broadcasting systems include satellite systems, cable or other wire-based systems, or over the air (OTA) broadcasting systems.

The media content events are communicated to the media device in the form of content streams. The media content event may then be provided to a viewer in a continuous, streaming manner and/or the media content events may be stored by a user in a digital video recorder ("DVR").

Media devices are also configured to receive media content events through an on demand system. An on demand system, for example, allows for the transmission of media content events to a media device based on a request by a user. However in some cases, the on-demand system is not able to provide media content events for requesting media devices. In these cases the on-demand system is generally low and/or out of available. The on-demand system may be low on bandwidth because it is transmitting media content events to a large quantity of media devices. In such cases the requesting media devices must wait or is unable to receive the selected media content event.

Prior art systems may employ multiple on demand systems and/or geographically positioned on-demand systems. However both of these solutions are very expensive without guarantees that the aforementioned bandwidth problem will be solved. Accordingly, there is a need for on-demand systems that can provide media content events without a loss of bandwidth.

SUMMARY

Systems and methods are operable to transmit at least a portion of a media content event. An exemplary embodiment receives a request from a first media device, wherein the request identifies a media content event of interest; identifies a first media content stream with a concluding portion of the media content event of interest currently transmitting to a second media device; concurrently transmits the concluding portion of the media content event of interest to the first media device; and transmits a second media stream containing an initial portion of the media content event to the first media device.

BRIEF DESCRIPTION OF THE DRAWINGS

Preferred and alternative embodiments are described in detail below with reference to the following drawings.

DETAILED DESCRIPTION

Figure 1A:
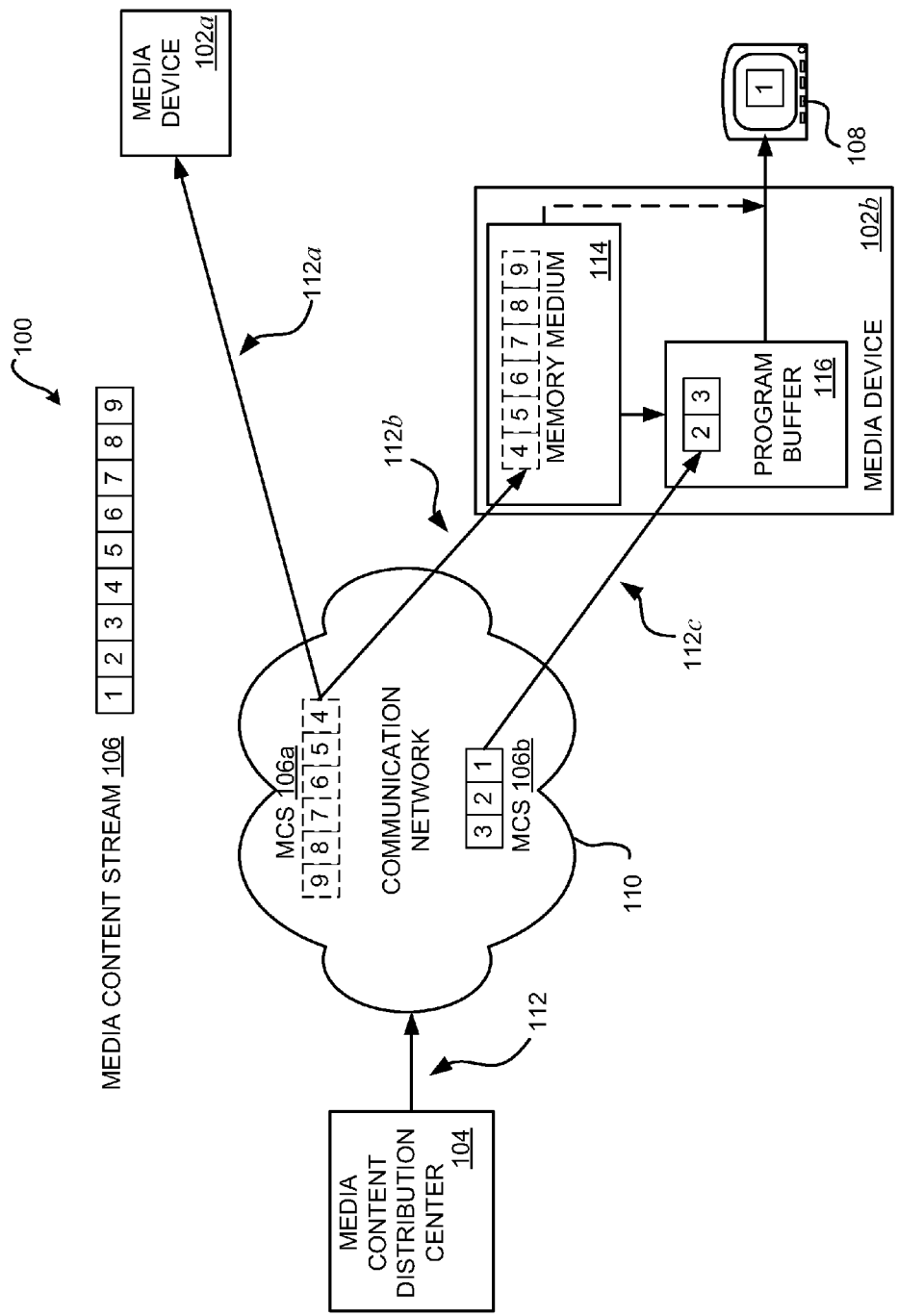
FIGS. 1a and 1b are block diagrams of example embodiments of a media content distribution system.

FIG. 1a is a block diagram of an example embodiment of a media content distribution system 100. The exemplary embodiment of the media content distribution system 100 is implemented in an exemplary environment that comprises a plurality of media devices 102, at least one media content distribution center 104, a media content stream 106, and an optional media presentation device 108. A communication network 110 connects media devices 102 with the media content distribution center 104 using communications link 112. The media devices 102a and 102b receive a media content stream 106 provided from the media content distribution center 104 over the communication network 110 using communications link 112.

An exemplary media device 102 includes, but is not limited to, a set top box that is communicatively coupled to the media distribution center 104. Other embodiments of the media device 102 include a television (TV), a digital video disc (DVD) player, a DVD recorder, a game playing device, a mobile device, and/or a personal computer (PC).

The media device 102 is configured to store selected media content events in a memory medium 114 and/or a program buffer 116. The memory medium 114 may take the form of a digital video recorder in some embodiments.

The program buffer 116 is configured to store a predefined duration of the media content stream 106. An exemplary program buffer 116 may store as much as two hours of media content in its memory medium (not shown) and/or in the memory medium 114. In some embodiments, the program buffer 116 is incorporated into, or is a virtual portion of, the memory medium 114.

The media device 102, when in operation, is configured by a user to present the media content stream 106 stored in the program buffer 116 and/or the memory medium 114 on a media presentation device 108. Exemplary media presentation devices 108 include, but are not limited to, TV's, stereos, radios, surround sound systems, personal computers and/or the like that may be communicatively coupled to the media device 102. In some embodiments, the media device 102 and the media presentation device 108 may be an integrated single electronic device.

In an exemplary embodiment, the media content distribution center 104 manages the distribution and transmission of media content events to a plurality of requesting media devices 102 via media content streams 106. Accordingly, the media content distribution center 104 performs a variety of functions. In particular the media content distribution center 104 is configured to track requests for media content events from media devices 102. The media content distribution center 104 is further configured to fill requests for media content from media devices 102.

In an exemplary embodiment, a media content stream 106 is conceptually illustrated as comprising nine exemplary portions (illustrated as numbered boxes 1-9). The nine exemplary portions may be defined by one or more video frames, a duration and/or the like. In this example embodiment, the portions are in sequentially numbered order and represent a media content event. In alternate embodiments there may be more or less than nine portions in a media content stream.

In an embodiment, the media content distribution center 104 receives a request for a media content event from media device 102b. In response to the request, the media content distribution center 104 attempts to identify another instance of the requested media content event that is currently being transmitted via media content stream 106 to any of the media devices 102.

In an exemplary embodiment, the media content distribution center 104 identifies that the requested media content event that is currently being transmitted to media device 102a via media content stream 106a (conceptually illustrated as portions 4-9) over communications link 112a. The media content distribution center 104, then concurrently transmits media content stream 106a to both media device 102a and requesting media device 102b. The media content event in the media content stream 106a represents the concluding portion of the requested media content event.

The media content distribution center 104, initiates the transmission of media content stream 106b (conceptually illustrated as portions 1-3) having an initial portion of the requested media content event to media device 102b. Alternatively the media content distribution center 104 identifies a currently transmitting media content stream carrying the initial portion and thus may not need to initiate transmission of media content stream 106b.

In an embodiment, the concluding portion of the requested media content event represented by portions 4-9 in media content stream 106a is stored by the media device 102b. The media device preferably stores the concluding portion in the memory medium 114 for future communication to the presentation device 108. The initial portion of the media content event received from media content stream 106b is preferably stored in the program buffer 116 for playback on the presentation device 108. Alternatively and/or additionally, the media content distribution center 104 may transmit an instruction to the media device 102b that causes the media device 102b to store both the initial portion and the concluding portion in the memory medium 114.

The media device 102b, when in operation, begins playback with the presentation of portion 1 in presentation device 108. Portions 2 and 3 are configured to be communicated from the program buffer 116 to the presentation device 108 at the conclusion of the presentation of Portion 1. The concluding portion stored in the memory medium 114 may either be communicated to the program buffer 116 for communication to the presentation device 108, or may be communicated directly to the presentation device 108 from the memory medium 114.

Figure 1B:
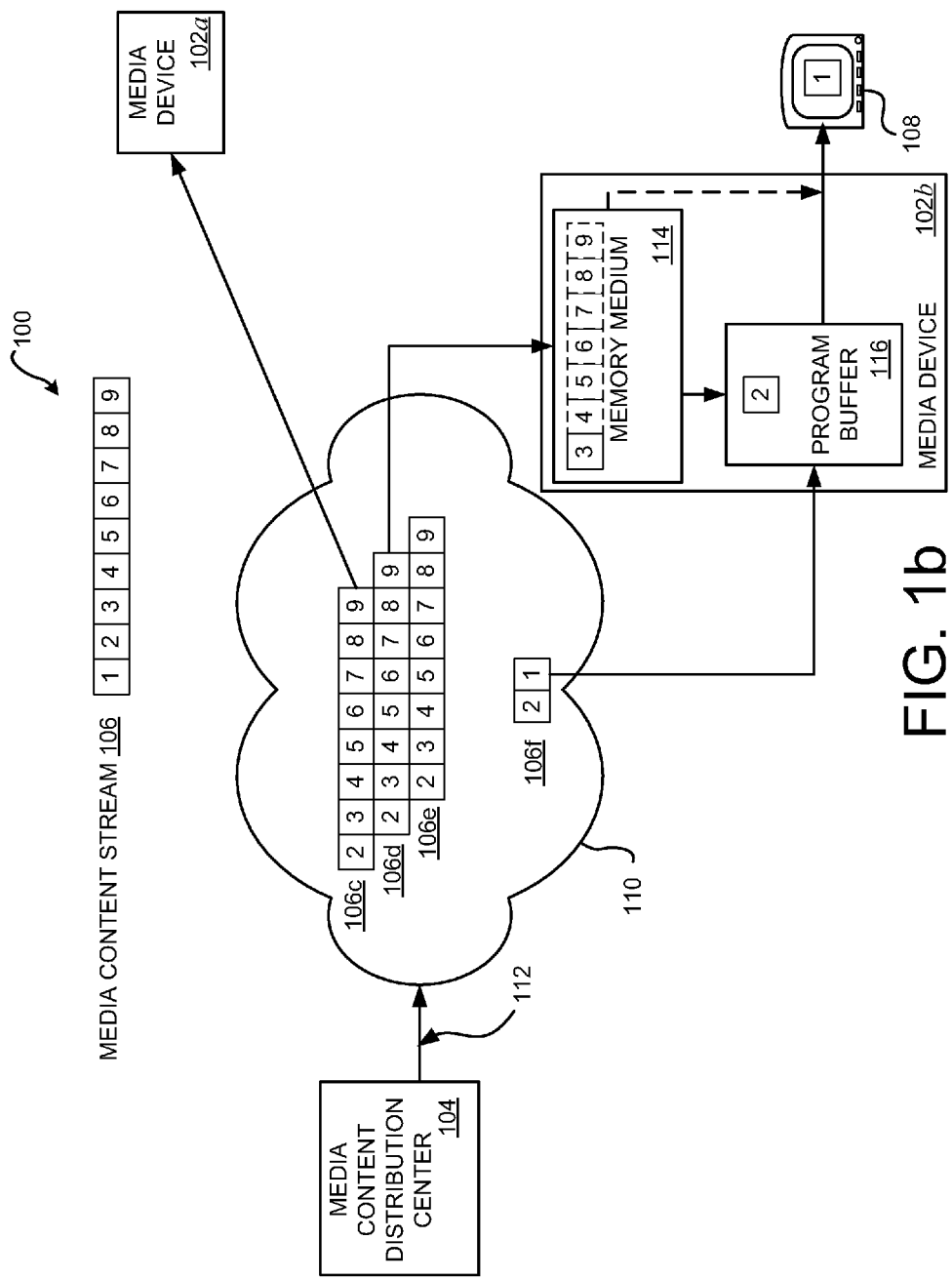

FIG. 1b is a block diagram of an example embodiment of a media content distribution system 100. An example embodiment of the media content distribution system 100 provides one or more multicast media content streams 106c-106e that are offset in time. A multicast media content stream 106 is a media content stream that allows for delivery of a media content stream simultaneously and/or nearly simultaneously to a plurality of media devices 102. Each of the multicast media content streams 106c-106e may be transmitted at different times. The media content distribution system 100 may also provide an initial portion of a media content event to a media device 102 to provide media content that was missed from a received multicast media content stream.

In an exemplary embodiment, the media content distribution center 104 receives a request for a media content event from media device 102b. In response to the request, the media content distribution center 104 initiates the transmission of media content stream 106f (conceptually illustrated as portions 1-2) having an initial portion of the requested media content event to media device 102b.

The initial portion of the requested media content event received from media content stream 106f is preferably stored in the program buffer 116 for playback on the presentation device 108. The media device 102b, when in operation, may begin playback immediately with the presentation of Portion 1 in presentation device 108. Portion 2 is configured to be communicated from the program buffer 116 to the presentation device 108 at the conclusion of the presentation of Portion 1.

In an exemplary embodiment, media device 102b may receive a portion of the initial portion of the media content stream 106f that has been previously communicated in the multicast media content stream. For example, the memory medium 114 and/or the program buffer 116 may receive Portion 2 from the multicast media content stream 106d. The media device 102b, may notify the media content distribution center 104 once the initial portion transmitted in media content stream 106f is no longer needed and/or may stop receiving media content stream 106f. Alternatively, or additionally the media content stream 106f may be a transmission of a unicast media content stream that is sent only to the media device 102b.

The media content distribution center 104 may concurrently provides an identifier of the currently transmitting multicast of the requested media content event. In an exemplary embodiment there may be three multicast media content streams 106c, 106d, and 106e. In alternate embodiments there may be additional media content streams and/or fewer media content streams. Exemplary identifier include a program identifier (PID), a transponder identity, a "channel" or the like which enables the media device 102 to access the multicast media content event.

In an exemplary embodiment, the media content distribution center 104 identifies the requested media content event that is currently being multicast via media content stream 106c, 106d and/or 106e (conceptually illustrated as portions 2-9) over communications link 112. The media content distribution center 104 then provides a notification to the media device 102b, wherein the notification identifies the media content stream, such as media content stream 106d that most recently began its broadcast. By tuning and/or accessing the multicast, the media device 102b may concurrently receive the initial portion of the requested media content event in media content stream 106f and the concluding portion via media content stream 106d.

In an example embodiment, the media content streams are generally offset in time, so that a requesting media device 102 such as media device 102b, would access the multicast with largest remaining amount of content. For example, each of the media content streams may be offset over time such that the media device 102b would select the multicast with the most available content to the size of the initial portion sent from the media content distribution center 104.

Figure 2:
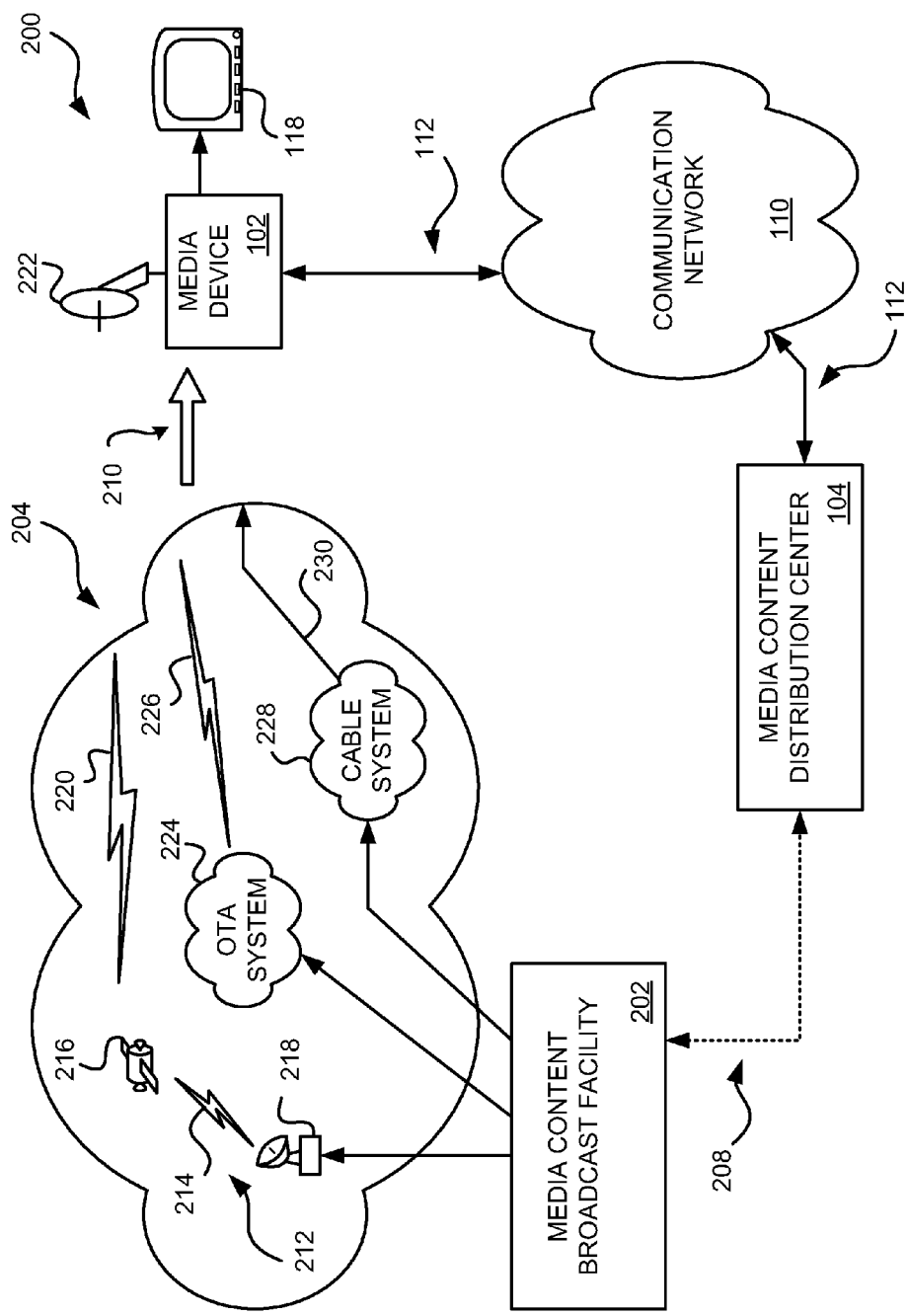
FIG. 2 is a block diagram of an embodiment of a media content distribution environment.

FIG. 2 is a block diagram of an embodiment of a media content distribution environment 200. The exemplary embodiment of the media content distribution system 200 is implemented in an exemplary environment that comprises a plurality of media devices 102, at least one media content distribution center 104, a media content broadcast facility 202, and a broadcast system 204. A communication network 110 connects media device 102 with media content distribution center 104 using communications link 112. A connection 208 connects the media content distribution center 104 and the media content broadcast facility 202. The media device 102 receives a media content stream 210 provided from the media content broadcast facility 202 over the broadcast system 204. The media content stream 210 is provided by a media content service provider.

An exemplary media device 102 includes, but is not limited to, a set top box that is communicatively coupled to the broadcast system 204. Other embodiments of the media device 102 include a television (TV), a digital video disc (DVD) player, a DVD recorder, a game playing device, a mobile device, and/or a personal computer (PC). The media device 102 is configured to store selected media content events that are received in the media content stream 210.

The media content stream 210 comprises a plurality of streamed media content events. Some media content broadcast facilities 202 simultaneously broadcast many media content events, even hundreds of broadcast media content events, in the media content stream 210. The media device 102, when in operation, is configured by a user to select one of the plurality of simultaneously broadcasting media content events for presentation on a media presentation device 108. Exemplary media presentation devices 108 include, but are not limited to, TV's, stereos, radios, surround sound systems, personal computers and/or the like that may be communicatively coupled to the media device 102 that is receiving the media content stream 210. In some embodiments, the media device 102 and the media presentation device 108 may be an integrated single electronic device.

An exemplary broadcast system 204 comprises a satellite broadcast system 212. A plurality of the media content streams 210 reside in a transport channel 214 that is uplinked to a plurality of satellites 216, via a corresponding transmit antenna 218. The respective transport channels are then communicated, in the form of a wireless signal 220, from a plurality of the satellites 216 down to a receiver antenna 222 that is communicatively coupled to the media device 102. The received wireless signal 220 (with the media content stream 210) is then communicated from the receiver antenna 222 to the media device 102. The receiver antenna 222 and the media device 102 may be configured to receive multiple wireless signals 220 from a plurality of satellites 216. The media content distribution center 104 may optionally receive the media content stream 210 with a receiver antenna (not shown) over the wireless system 212.

Alternatively, or additionally, the plurality of media content events may be broadcast to the media device 102 via an over the air (OTA) system 224. For example, the media content broadcast facility 202 may be a local program provider that broadcasts media content events to the media device 102 using a wireless signal 226. The received wireless signal 226 with the media content stream 210 is received at the receiver antenna 222, or may be received directly by a receiver (not shown) residing in the media device 102. The media content distribution center 104 may optionally receive the media content stream 210 over the OTA system 224.

Alternatively, or additionally, the plurality of media content events may broadcast to the media device 102 via a cable system 228. For example, the media content broadcast facility 202 may employ a coaxial cable and/or fiber optic cable 230 that is coupled to the media device 102. The media content stream 210 is received directly by the media device 102. The media content distribution center 104 may optionally receive the media content stream 210 over the cable system 228.

Alternatively, or additionally, the media content broadcast facility 202 may use an internet protocol television system (not shown) to deliver a plurality of media content events to the media device 102 via the OTA system 224, the cable system 228 and/or a wired connection. The media content distribution center 104 may optionally receive the media content events using the internet protocol television system.

In an exemplary embodiment the media device 102 establishes a communications link 112, using the communications network 110, to the media content distribution center 104. Once the communications link 112 is established between the media device 102 and the media content distribution center 104, the media device 102 sends a request for a media content event to the media content distribution center 104. In response, the media content distribution center 104 transfers a media content stream carrying the requested media content event to the media device 102.

In an exemplary embodiment, when the media content distribution center 104 receives a request from a requesting media device 102, and the request identifies a media content event, the media content distribution center 104 attempts to identify another instance of the requested media content event currently transmitting to at least one media device 102. If the media content distribution center 104 identifies another instance of the media content event currently transmitting to at least one media device 102, the media content distribution center 104 concurrently transmits the identified instance of the media content the requesting media device 102. The media content distribution center 104 transmits the portion not currently transmitting (e.g., the initial portion of the media content event) to the requesting media device 102 in a separate media content stream.

The media content distribution center 104 may be located separate from the media device 102 and the media content broadcast facility 202 as is shown in FIGS. 1a and 1b. However in some embodiments, the media content distribution center 104 may be part of the media content broadcast facility 202 and/or the media device 102.

Figure 3:
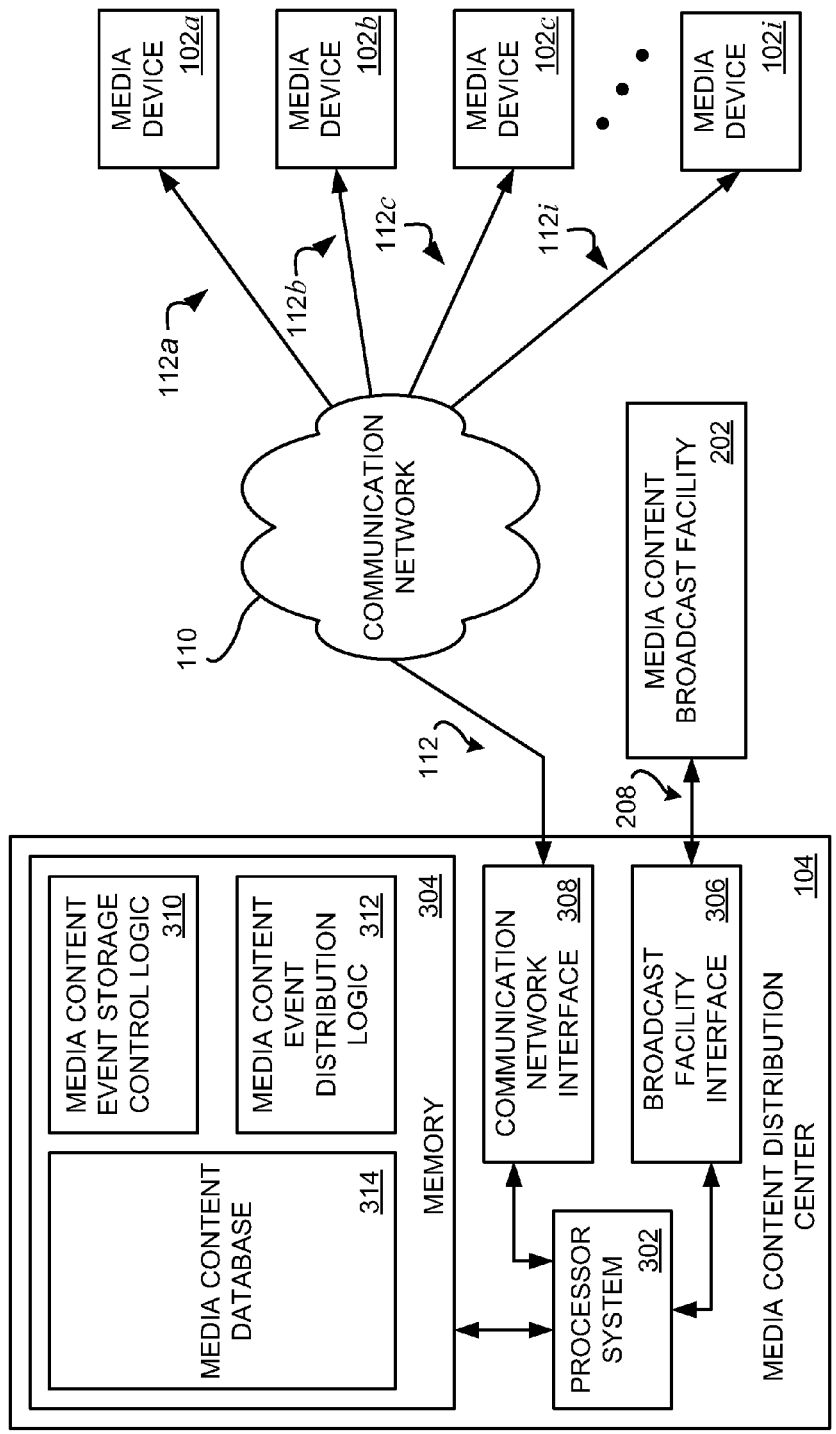
FIG. 3 is a block diagram of an embodiment a media content distribution center.

FIG. 3 is a block diagram of an exemplary embodiment of the media content distribution center 104. The exemplary media content distribution center 104 is configured to store a plurality of media content events, and respond to requests to communicate a media content event to a plurality of connected media devices 102. The non-limiting exemplary media content distribution center 104 comprises a processor system 302, a memory 304, an optional broadcast facility interface 306, and a communication network interface 308. The memory 304 comprises portions for media content event storage logic 310, media content event retrieval logic 312, and a media content database 314. In some embodiments, the media content event storage logic 310 and the media content event retrieval logic 312 may be integrated together, and/or may be integrated with other logic. In some embodiments, the media content database 314 may be stored in a separate memory medium. Other media content distribution centers 104 may include some, or may omit some, of the above-described components. Further, additional components not described herein may be included in alternative embodiments of the media content distribution center 104.

Alternatively, or additionally, embodiments of the media content distribution center 104 may be configured to receive a broadcast media content stream 116 directly from the media content broadcast facility 106 and/or directly from another media content source (not shown). The processor system 302, executing the media content event storage logic 310, stores the media content events into the media content database 314 memory medium.

Embodiments of the communication network interface 308 are configured to communicatively couple the media content distribution center 104 with the media devices 102a, 102b, 102c, and 102i via the communication links 112a, 112b, 112c, and 112i. The communication network interface 308 is preferably configured to accommodate a plurality of communication links to a plurality of media devices 102 such that each media device 102 may receive a requested media content event. The communication network interface 308 may be any suitable communication device, component, or system operable to communicate over the communication network 110.

Embodiments of the broadcast facility interface 306 are configured to communicatively couple the media content distribution center 104 with the media content broadcast facility 106, via the communication link 208. The broadcast facility interface 306 may be any suitable communication device, component, or system operable to communicate over the communication link 208 established with the media content broadcast facility 106.

In operation, an exemplary embodiment of the media content distribution center 104 is configured to store a plurality of media content events. The media content event storage logic 310 manages storage of the selected media content events. In an exemplary embodiment, the media content event storage logic 310 may employ a database management system to track and manage a plurality of stored media content events.

Depending upon the configuration of the media content event storage logic 310, one or more of the selected media content events may be stored as they are being broadcast. Alternatively, or additionally, the media content distribution center 104 may have stored the media content events prior to the broadcasting of the media content events in the broadcast media content stream 116.

The identification of selected media content events may be specified in instructions received from the media content broadcast facility 106 and/or the like. For example, instructions may be received to store each first run major network media content event. Alternatively, or additionally, one or more particular channels may be specified for which the selected media content events provided on the specified channels are stored.

Further, the media content event storage logic 310 may manage erasure, deletion, or removal of previously stored selected media content events. For example, stored selected media content events may be retained for a predefined duration. Upon expiration of the duration, the initial portion of the selected media content event may be deleted, erased, or otherwise removed.

The media content event retrieval logic 312 manages communication of the requested media content event to requesting media devices 102. The media content event retrieval logic 312 is executed to process each request to establish a communication link 112 with a requesting media device 102. If the request is valid, the communication link 112 is established. For example, an identifier, security code, or the like may be included in the initial request that indicates that the media device 102 is authorized to receive a portion of the requested media content event. Security features may be used to verify that the electronic device that is attempting to establish a communication link is a bona-fide media device 102. Accordingly, access by unauthorized media devices 102, impostor electronic devices, or the like, may be denied.

In an exemplary embodiment the transmission of requested media content event is packetized for communication over the communications system 110. Each packet comprises a header and packetized content. The header provides identification information pertaining to the contents of the communicated packet. For example, but not limited to, a header may include a device identifier (corresponding to the identity of the media device 102), and a program identifier or PID (corresponding to information that identifies the particular program content). The packet based system allows the media distribution center 104 to multicast the requested media content event. In other words the media content distribution center may transmit the media content event to a plurality of media devices 102 simultaneously in a single transmission. The ability to concurrently transmit any content stream to multiple media devices 102 advantageously allows for a reduced usage of bandwidth at the media content distribution center 104.

Once the communication link 112 is established with the requesting media device 102, the media content event retrieval logic 312 processes the request to identify at least one media content stream currently transmitting the requested media content event. When the media content event retrieval logic 312 identifies a first media content stream currently transmitting the requested media content event to a first media device 102a, the media content event retrieval logic 312 concurrently transmits the first media content stream to the first media device 102a and the requesting media device 102b. In this exemplary embodiment, both the first media device 102a and the requesting media device 102b both receive the first media content stream concurrently.

In exemplary embodiment, the media content event retrieval logic 312 identifies more than one media content stream currently transmitting the media content event of interest. For example, the media content distribution center 104 may be transmitting the media content stream to media devices 102a, 102c, and 102i. The media content retrieval logic 312 identifies a concluding portion and intermediate portions of the more than one media content stream currently transmitting to media devices 102a, 102c, and 102i. The media content event retrieval logic 312 then transmits the identified concluding portion intermediate portions to the requesting media device 102b.

For example, at a given time the media content event distribution center 104 may be transmitting the same media content event to multiple media device 102a, 102b, 102c, and 102i. In some instances a first media device 102a may request the media content event after a second media device 102b. In such a case, the media content stream transmitted to the second media device 102b will concurrently be transmitted to the first media device 102a. The first media device 102a will also receive a second media content stream including the initial portion of the media content event currently being transmitted to the second media device.

In an exemplary embodiment, the media content event retrieval logic 312 determines a duration of the media content event. The media content event retrieval logic 312 then determines the duration of the intermediate portions and the concluding portion of the requested media content event. The media content event retrieval logic 312 determines the duration of a needed initial portion based on the identified intermediate portions and concluding portion. Alternatively, the media content retrieval logic 314 may receive duration information from the broadcast facility 202 and/or the like.

The media content event retrieval logic 312 activates a transmission of the determined initial portion to the media device 102. Generally, a requesting media device 102 will simultaneously receive intermediate portions, the concluding portion and an initial portion from the media content distribution center 104.

The media content distribution center 104 may also provide a notification to the media device 102 identifying a first media content stream and a second media content stream. The first media content stream provides an initial portion of the requested media content event and the second media content stream provides a concluding portion of the requested media content event. The notification further includes instructions on combining the first media content stream and the second media content stream such that the media device 102 has a complete portion of the requested media content event.

In an exemplary embodiment, the media content distribution center 104 may be located at any convenient location so as to have access to the communication system 112 and/or the media content broadcast facility 202 (FIGS. 1a and 1b). Some embodiments may be co-located at, located within, and/or may be an integrated component of, the media content broadcast facility 106.

Alternatively, or additionally, the media content distribution center 104 may receive the media content events directly from the media content broadcast facility 106 over a communication link 208. The communication link 208 may be a dedicated communication link, such as an Ethernet communication link, a fiber optic communication link, a wireless link, a cable link, or the like. In some embodiments, the communications link 112 may be established through the communication network 110, or may be established through a portion of the communication network 110. In embodiments that directly receive media content events, the media content events may be communicated to the media content distribution center 104 at any time.

Some embodiments of the media content distribution center 104 are configured to establish the communication link 112 to the media content broadcast facility 108, or another facility, so that ancillary services and/or functionality may be provided. For example, users may be charged a fee, and/or may pay for the service on a monthly basis or the like, for receiving missed media content. The media content distribution center 104 may communicate usage information and/or other information back to a billing center so that the services may be tracked and/or managed.

Figure 4:
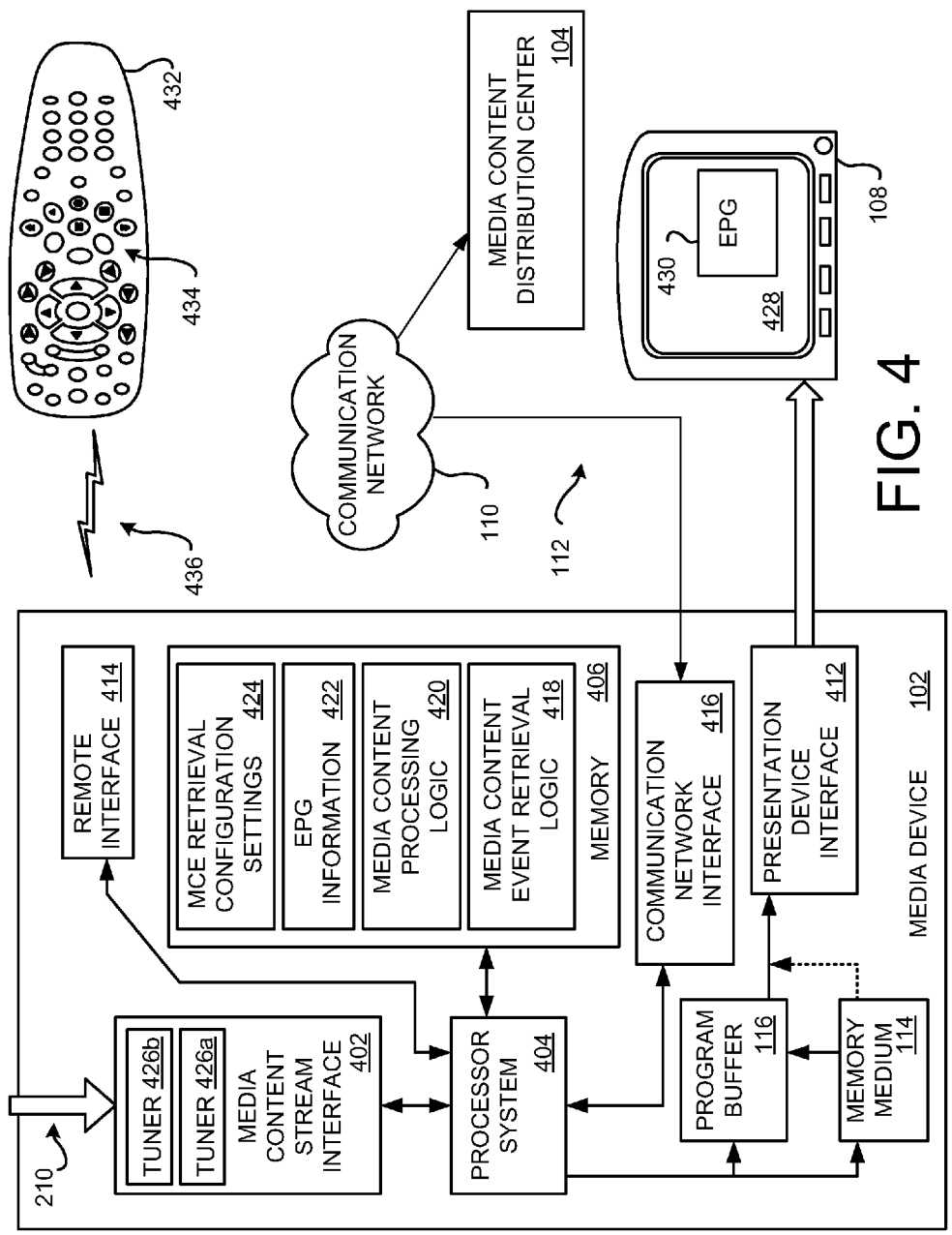
FIG. 4 is a block diagram of an embodiment of an exemplary media device.

FIG. 4 is a block diagram of an exemplary media device 102 that is configured to request and receive a specified media content event. The non-limiting exemplary media device 102 comprises a media content stream interface 402, a processor system 404, a memory 406, a memory medium 114, a program buffer 116, a presentation device interface 412, a remote interface 414, and a communication network interface 416. The memory 406 comprises portions for storing media content event retrieval logic 418, media content processing logic 420, electronic program guide (EPG) information 422, and media content event (MCE) retrieval configuration settings 424. In some embodiments, the media content event retrieval logic 418 and the media content processing logic 420 may be integrated together, and/or may be integrated with other logic. Other media devices 102 may include some, or may omit some, of the above-described media processing components. For example, the media device 102 may comprise and/or be coupled to any suitable recorder that stores media content on a memory medium 114, such as a digital video recorder ("DVR"). Further, additional components not described herein may be included in alternative embodiments of the media device 102.

The functionality of the media device 102, here a set top box, is now broadly described. One or more broadcast media content streams 116 are delivered via the broadcast system 202 (FIGS. 1a and 1b) that is operated by the media content provider. The one or more broadcast media content streams 116 are received by the media content stream interface 402. One or more tuners 426a, 426b in the media content stream interface 402 selectively tune to one of the broadcast media content streams 116 in accordance with instructions received from the processor system 404. The tuners 426a, 426b may be configured to operate in conjunction with DOCSIS 3.0 and/or other like transmission protocols.

The processor system 404, executing the media content processing logic 420, and based upon a request for a selected media content event of interest specified by a user, operates the media content stream interface 402 to receive a selected media content event, and parses out program content associated with a selected media content event of interest. The media content event of interest is then assembled into a stream of video and/or audio information which may be stored by the program buffer 116 such that the media content event can be communicated to the media presentation device 108 via the presentation device interface 412. The memory medium 114 may be directly provided in, locally connected to, or remotely connected to, the media device 102.

In this simplified embodiment, the presentation device interface 412 is illustrated as coupled to a media presentation device 108 that includes a display 428, such as a television. The video portion of the streamed media content event of interest is displayed on the display 428. The audio portion of the streamed media content event of interest is reproduced as sounds by speakers (not shown).

The exemplary media device 102 is configured to receive commands from a user via a remote control 432. The remote control 432 includes one or more controllers 434. The user, by actuating one or more of the controllers 434, causes the remote control 432 to generate and transmit commands, via a wireless signal 436, to the media device 102. The commands control the media device 102 and/or control the media presentation device 108. The wireless signal 436 may be an infrared signal and/or an RF signal. Accordingly, the remote interface 414 is configured to receive the wireless signal 436 emitted by the exemplary remote control 432.

The remote control 432, in an exemplary embodiment, may be used by the user to request a particular media content event of interest from the media content distribution center 104. Upon selection of a media content event the selected media content event of interest begins nearly immediately.

An exemplary embodiment permits a user to request a media content event of interest from the media content distribution center 104. An exemplary embodiment of the remote control 432 includes one or more of the controllers 434 that are configured to initiate the process of retrieving the media content event of interest from the media content distribution center 104. Further, a selection may be made to initiate the process of retrieving the media content event by operating the controllers 434 to navigate about the presented EPG 430.

Embodiments of the communication network interface 416 are configured to communicatively couple the media device 102 with the media content distribution center 104, via the communication link 208. The communication network interface 416 may be any suitable communication device, component, or system operable to communicate over the communication network 110.

The communication network 110 is illustrated as a generic communication system. In one embodiment, the communication network 110 comprises the Internet. Accordingly, the communication network interface 416 is a modem or other type of Internet communication device. Alternatively, the communication network 110 may be a telephony system, a radio frequency (RF) wireless system, a microwave communication system, a fiber optics system, an intranet system, a local access network (LAN) system, an Ethernet system, a cable system, a cellular system, or a hybrid system comprised of multiple types of communication media. In such embodiments, the communication network interface 416 is configured to establish the communication link 112 with the communication network 110 on an as-needed basis, and is configured to communicate over the particular type of communication network 110 that it is coupled to. In some embodiments, portions of the communication network 110 may employ portions of the broadcast system 202 (FIG. 2).

The media content processing logic 420 manages the various media processing functions. For example, but not limited to, media content processing logic 420 may manage processing of the received broadcast media content stream 116, manage the tuners 426a, 426b, assemble the currently presented media content event into a video stream and audio stream that is communicated to one or more media presentation devices 108, store currently presented media content events and/or selected media content events into the program buffer 116 and/or the memory medium 114, process user instructions communicated from the remote control 432, construct a presentable EPG 430 based on the EPG information 422, and/or perform other functionality of the media device 102.

The MCE retrieval configuration settings 424 comprise a data storage repository for information that is used by the media device 102 to retrieve the requested media content event from the media content distribution center 104. For example, a web site address or other identifier of the media content distribution center 104 may be saved in the MCE retrieval configuration settings 424 to facilitate establishment of the communication link 112 between the media device 102 and the media content distribution center 104.

The media content event retrieval logic 418 provides the logic, when executed by the processor system 404, to manage retrieval of the requested media content event. For example, the media content event retrieval logic 418 may process an instruction to retrieve the selected media content event received from the remote control 432 or another input device.

The media content event retrieval logic 418 may manage the establishment of the communication link 112 between the media device 102 and the media content distribution center 104. In some embodiments, multiple media content distribution centers 104 may be available. A plurality of media content distribution centers 104 may be used to accommodate different geographic regions and/or to accommodate different technologies of the communication network 110. Thus, an identity and/or communication link establishment instructions may be retrieved from the MCE retrieval configuration settings 424 so that the request for the selected media content event is communicated to a preferred media content distribution center 104.

The media content event retrieval logic 418 may manage generation and/or communication of the request made by the media device 102, to the media content distribution center 104 for a requested media content event. The media content event distribution center 104 may generate the request based upon the identity of the media content event.

When the media device 102 generates a request for the media content event, an exemplary embodiment includes the identity of the requested media content event of interest. In an exemplary embodiment, once the media device 102 has provided the request for the media content event, the media content distribution center 104 may identify one or more currently transmitting media content streams that contain a portion of the media content event can be provided to the requesting media device 102.

In such embodiments, the media content distribution center 104 may have information stored in the memory 304 that identifies the first video frame and the last video frame of the requested media content event in an initial portion. The frames may be identified based on known portions of the media content event of interest. For example, the media content distribution center may store a media content event in one minute portions, and thus may identify the first and last frames in a particular one minute portion. The media content distribution center 104 may provide identification information of the first video frame and the last video frame of a concluding portion. This information may also be included in the response returned to the requesting media device 102.

The media content event retrieval logic 418 may manage the processing of instructions received from the media content event distribution center 104. For example, upon receiving instructions from the media content event distribution center 104 that identifies one or more media content streams that may provide portions of the requested media content event, the media content event retrieval logic 418 may manage the multiple received media content streams. The media content event retrieval logic 418 may manage the initial portion of the media content event received from a first media content stream over communications link 112a. Media content event retrieval logic 418 concurrently manages the concluding portion of the media content event received from a second media content stream over communications link 112b.

The initial portion of the media content event may be placed in the program buffer 116 and/or the memory medium 114. The concluding portion is generally placed in the memory medium 114. In some embodiments the initial portion, once received from the program buffer 116, is communicable to the presentation device 108.

Once the initial portion of the media content event has been communicated to the media device 102, the initial portion of the media content event may be presented to the user (or may be stored by the media device 102). When the last video frame of the received initial portion of the media content event has been presented (or stored), then presentation may continue with the concluding portion of the media content event as long as it has been received by the media device 102.

In the various embodiments, presentation of the initial portion of the media content event may transition to the presentation of the concluding portion of the media content event using any suitable technology or process. Preferably, there will be little or no discernable disruption in the presentation of the media content event during the transition. If the formats of the received initial portion of the media content event and the stored remaining portion of the media content event are the same, then an exemplary embodiment may buffer the initial video frame, for example, so that presentation of the video frame begins in sequence with, and with proper timing synchronization, with the last video frame of the received initial portion of the media content event.

However, the formats of the received initial portion of the media content event and the stored remaining portion of the media content event may be different. For example, but not limited to, the received initial portion of the media content event may be in a standard definition format, whereas the stored remaining portion of the media content event may be in a high definition format. Accordingly, the user may perceive the transition between the initial portion of the media content event and the remaining portion of the media content event.

When multiple media content streams are available that provide the media content event, then the media content event retrieval logic 418 may manage the selection of which particular one of the media content streams will be accessed. However, generally the media content distribution center 104 will manage the selection of the media content streams.

In the exemplary embodiment, the media content event is transmitted over communications network 110 using a packet-based system. In a packet-based system the media content district stream includes a device identifier that that identifies the media device 102. The media content event retrieval logic 418 operating the communications network interface 416 identifies the packets directed to the media device 102. The received packets are stored in the program buffer 116 and/or the memory medium 114. The processor system 404 operating the media content event retrieval logic 418, compiles the media content event.

Some embodiments of the media device 102 may be configured to receive additional instructions from the media content distribution center 104 that cause the media device 102, executing the content retrieval logic 418, to store a portion of the received media content event. The media device may receive additional instructions to store multiple portions of the media content event from multiple media content streams. The media content distribution center 104 may also provide instructions on combining the received portions of the requested media content event.

In an alternate embodiment the received instructions may cause the media device 102 to operate one of its tuners 426 to receive the requested media content event, and then store the portion of the media content event into its program buffer 116 and/or its memory medium 114. For example, the media device 102 may store an initial portion of the requested media content event in the program buffer 116 and concluding portions of the media content event and memory medium 114. In an alternate embodiment, the media content event a received to the communications network interface 416 and placed into the program buffer 116 and/or the memory medium 114 by the media content event retrieval logic 418 running on the processor system 404.

It should be emphasized that the above-described embodiments of the media content distribution system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method that communicates a media content event of interest from a media content distribution center, wherein the media content event of interest is defined by a serial ordered plurality of portions that begins with a first portion and is followed by a second portion, the method comprising:
   concurrently broadcasting a plurality of first media content streams to a plurality of media devices,
   wherein each of the plurality of first media content streams include a concluding portion of the media content event of interest,
   wherein the concluding portion begins with the second portion of the plurality of portions of the media content event of interest,
   wherein the second portion is followed by remaining portions of the media content event of interest,
   wherein the concluding portion of each of the plurality of first media content streams are broadcast offset in time from each other by a duration that includes at least the second portion of the media content event of interest;
   receiving a request from a first media device of the plurality of media devices, wherein the request identifies the media content event of interest;
   identifying a first one of the broadcast plurality of first media content streams that is currently broadcasting the second portion of the media content event of interest at a time that the request is received from the first media device, wherein the concluding portion of the media content event of interest in the identified first one of the broadcast plurality of first media content streams is receivable at the first media device;
   transmitting an instruction to the first media device in response to the communicated request, wherein the instruction has information that identifies the first one of the concurrently broadcast plurality of first media content streams; and
   concurrently transmitting a second media content stream containing an initial portion of the media content event of interest to the first media device, wherein the initial portion includes the first portion and the second portion of the media content event of interest.

2. The method of claim 1, further comprising:
   transmitting an instruction to the first media device, wherein the instruction causes the first media device to store the initial portion and the concluding portion of the media content event of interest.

3. The method of claim 1, further comprising:
   determining a total duration of the media content event of interest;
   determining a concluding duration of the concluding portion of the media content event of interest; and
   calculating an initial duration of the initial portion of the media content event of interest to be transmitted based on the difference between the total duration of the media content event of interest and the determined concluding duration of the concluding portion.

4. The method of claim 1, further comprising:
   identifying a first video frame of the second portion of the concluding portion of the media content event of interest;
   identifying a last video frame of the first portion of the initial portion of the media content event of interest based on the identified first video frame of the concluding portion; and
   transmitting instructions to the first media device to enable continuous playback, the instructions comprising identification of the first video frame of the concluding portion and the last video frame of the initial portion.

5. The method of claim 1, further comprising:
   transmitting a notification to the first media device, wherein the notification identifies the first one of the broadcast plurality of first media content streams that is broadcasting the second portion of the media content event of interest at the time that the request is received from the first media device; and
   operating, at the first media device, a tuner to receive the identified first one of the broadcast plurality of first media content streams.

6. The method of claim 5, further comprising:
   establishing a communication link, at the first media device, to at least one media content distribution center, wherein the initial portion of the media content event of interest operating at the first media device is received at the first media device over the established communication link.

7. The method of claim 6, wherein the communication link is established over the Internet.

8. A method for receiving media content events at a media device, the method comprising:
   communicating a request to a media content distribution center for a media content event of interest, wherein the media content event of interest is defined by a serial ordered plurality of portions that begins with a first portion and is followed by a second portion;
   receiving a plurality of first media content streams in response to the communicated request with a concluding portion of the media content event of interest that are concurrently transmitted to a plurality of media devices,
   wherein the concluding portion begins with the second portion of the plurality of portions of the media content event of interest,
   wherein the second portion is followed by remaining portions of the media content event of interest,
   wherein the concluding portion of each of the plurality of first media content streams are broadcast offset in time from each other by a duration that includes at least the second portion of the media content event of interest;

receiving information in response to the communicated request, wherein the information identifies one of the concurrently broadcast plurality of first media content streams, and wherein the identified one of the concurrently broadcast plurality of first media content streams is currently broadcasting the second portion of the media content event of interest; and receiving a second media content stream containing an initial portion of the media content event of interest, wherein the initial portion includes the first portion and the second portion of the media content event of interest.

9. The method of claim 8, further comprising:
storing the initial portion and the concluding portion in a memory medium such that when presented, the initial portion and the concluding portion allow for continuous playback of the media content event of interest.

10. The method of claim 8, further comprising:
receiving identification information from the media content distribution center identifying a first video frame of the second portion of the media content event of interest;
receiving identification information from the media content distribution center identifying a last video frame of the first portion of the media content event of interest; and
storing the first media content stream and the second media content stream such the last video frame and the first video frame are in sequence.

11. The method of claim 8, further comprising:
receiving a notification from the media content distribution center, wherein the notification has a device identifier corresponding to the requesting media device.

12. The method of claim 11, wherein the notification includes information that identifies one of the plurality of first media content streams that is broadcasting the second portion at the time that the request was communicated from the requesting media device.

13. The method of claim 12, further comprising:
operating a tuner of the media device to receive the identified one of the broadcast plurality of first media content streams.

14. The method of claim 8, wherein receiving the plurality of first media content streams in response to the communicated request further comprises:
receiving a notification that identifies one of the plurality of first media content streams that is broadcasting the second portion of the media content event of interest at a time that the request is communicated from the media device; and
tuning a tuner in the media device to the identified one of the plurality of first media content streams.

15. A media device comprising:
a communication network interface communicatively coupled to the media device with at least one media content distribution center;
a memory medium that stores at least a concluding portion of a received media content event that is included in an identified one of a plurality of concurrently broadcast media content streams of a media content event of interest,
wherein the media content event of interest is defined by a serial ordered plurality of portions that begins with a first portion and is followed by a second portion,
wherein each of the plurality of concurrently broadcast media content streams include a concluding portion of the media content event of interest,
wherein the concluding portion begins with the second portion of the plurality of portions of the media content event of interest,
wherein the second portion is followed by remaining portions of the media content event of interest, and
wherein the concluding portion of each of the plurality of concurrently broadcast media content streams are broadcast offset in time from each other by a duration that includes at least the second portion of the media content event of interest;
a processor system communicatively coupled to the communication network interface and the memory medium, wherein the processor system is operable to:
generate a request that is communicated to a media content distribution center for the media content event of interest;
receive an instruction in response to the communicated request, wherein the instruction identifies a first one of the concurrently broadcast media content streams to select, and wherein the identified one of the concurrently broadcast media content streams is currently broadcasting the second portion of the media content event of interest;
process the selected first one of the concurrently broadcast media content streams in response to the communicated request, wherein the selected first one of the concurrently broadcast media content streams includes the concluding portion of the media content event of interest that is currently broadcasting the second portion; and
process a received second media stream containing an initial portion of the media content event of interest, wherein the initial portion includes the first portion and the second portion of the media content event of interest.

16. The media device of claim 15, further comprising:
a media content event retrieval module, when executed on the processor system, stores at least the concluding portion in the memory medium such that when presented, the initial portion and the stored concluding portion allows for continuous playback of the media content event of interest.

17. The media device of claim 15, further comprising:
a presentation device interface that communicates the first media content stream and the second media content stream in the memory medium to a media presentation device.

18. The media device of claim 15 further comprising:
a media content event retrieval module, when executed on the processor system, that requests from the media content distribution center, additional media content when a duration of the initial portion and a duration of the concluding portion are less than a total duration of the media content event of interest.

19. The media device of claim 15 further comprising:
a media content event retrieval module, when executed on the processor system, that processes a received notification from the media content distribution center, wherein the notification identifies the selected one of the concurrently broadcast media content streams,
wherein the notification has a device identifier corresponding to the requesting media device.

20. A method that communicates media content from a media content distribution center, the method comprising:
receiving a request from a first media device, wherein the request identifies a media content event of interest, wherein the media content event of interest is defined by a serial ordered plurality of portions that begins with a first portion and is followed by a second portion;

concurrently broadcasting a plurality of first media content streams from the media content distribution center, wherein the broadcast plurality of first media content streams are accessible by the first media device and a plurality of other media devices, wherein each one of the broadcast plurality of first media content streams comprises a concluding portion of the media content event of interest, wherein the concluding portion begins with the second portion of the plurality of portions of the media content event of interest, wherein the second portion is followed by remaining portions of the media content event of interest, and wherein the concluding portion of each of the plurality of first media content streams are broadcast offset in time from each other by a duration that includes at least the second portion of the media content event of interest;

transmitting an instruction to the first media device in response to the communicated request, wherein the instruction identifies one of the concurrently broadcast plurality of first media content streams, and wherein the identified one of the concurrently broadcast plurality of first media content streams is currently broadcasting the second portion of the media content event of interest; and transmitting a second media content stream containing an initial portion of the media content event to the first media device, wherein the initial portion includes the first portion and the second portion of the media content event of interest.

21. The method of claim 20, further comprising:
transmitting an instruction to the first media device, wherein the instruction enables the first media device to access the concluding portion of the first media content stream.

22. The method of claim 20, further comprising:
assigning a device identifier of the first media device to the first media content stream and the second media content stream.

23. A media device comprising:
a processor system;
a tuner that receives at least one of a plurality of broadcast media content streams with a concluding portion of a media content event of interest,
wherein the media content event of interest is defined by a serial ordered plurality of portions that begins with a first portion and is followed by a second portion,
wherein the concluding portion begins with the second portion of the plurality of portions of the media content event of interest,
wherein the second portion is followed by remaining portions of the media content event of interest, and
wherein the concluding portion of each of the plurality of broadcast media content streams are broadcast offset in time from each other by a duration that includes at least the second portion of the media content event of interest; and a communication network interface communicatively coupled to the processor system and the tuner, wherein the communication network interface is communicatively coupled to the media device with at least one media content distribution center, wherein the communication network interface is operable to:

communicate a request to a media content distribution center for the media content event of interest;

receive an instruction in response to the communicated request, wherein the instruction identifies one of the broadcast plurality of media content streams, wherein the identified one of the broadcast plurality of media content streams is concurrently transmitted to a plurality of media devices and comprises the concluding portion of the media content event of interest that is currently broadcasting the second portion, and wherein an initial portion of the media content event of interest has been previously communicated; and receive a unicast media content stream containing the initial portion of the media content event of interest, wherein the initial portion includes the first portion and the second portion of the media content event of interest.

24. The media device of claim 23, further comprising:
a memory medium communicatively coupled to the processor system and the communication network interface, wherein the memory medium stores at least the concluding portion of the received media content event of interest, wherein the stored media content event of interest begins with the second portion; and
a presentation device interface that communicates the initial portion of the media content event of interest received in the unicast media content stream to a presentation device, wherein the concluding portion is presented upon conclusion of the presentation of the initial portion to allow for continuous playback of the media content event of interest.

25. The media device of claim 23, wherein the communication network interface is further operable to:
receive a notification from the media content distribution center, wherein the notification identifies a device identifier corresponding to the requesting media device.

26. The media device of claim 23, wherein the presentation of the initial portion ends with an end of presentation of the first portion of the media content event of interest, and wherein presentation continues with the second portion of the media content event of interest that was received in the identified one of the plurality of broadcast media content streams.

27. The media device of claim 23, wherein the presentation of the initial portion ends with an end of presentation of the second portion of the media content event of interest, and wherein presentation continues with a third portion of the media content event of interest that was received in the identified one of the plurality of broadcast media content streams, wherein the third portion follows the second portion.

* * * * *